US006780390B2

(12) United States Patent
Bhagat et al.

(10) Patent No.: US 6,780,390 B2
(45) Date of Patent: Aug. 24, 2004

(54) METHOD OF PRODUCING HIGH PURITY GERMANIUM TETRAFLUORIDE

(75) Inventors: Sudhir Solomon Bhagat, Tulsa, OK (US); Dayal T. Meshri, Tulsa, OK (US); Sanjay D. Meshri, Tulsa, OK (US); Michale Shane Petty, Claremore, OK (US)

(73) Assignee: Advance Research Chemicals, Inc., Catoosa, OK (US)

( * ) Notice: Subject to any disclaimer, the term of this patent is extended or adjusted under 35 U.S.C. 154(b) by 173 days.

(21) Appl. No.: 10/218,894

(22) Filed: Aug. 14, 2002

(65) Prior Publication Data

US 2004/0076577 A1 Apr. 22, 2004

(51) Int. Cl.[7] .............................. C01G 17/04; C01B 9/08
(52) U.S. Cl. ......................... 423/489; 423/494; 423/659
(58) Field of Search ................................. 423/489, 494, 423/659

(56) References Cited

U.S. PATENT DOCUMENTS

| 4,960,581 A | * | 10/1990 | Harada et al. | 423/489 |
| 5,899,733 A | * | 5/1999 | Gisdakis et al. | 438/528 |
| 5,918,106 A | * | 6/1999 | Bulko et al. | 423/260 |
| 2001/0049457 A1 | * | 12/2001 | Stephens | 570/123 |

OTHER PUBLICATIONS

Dennis et al, "Germanium. XXI Germanium Tetrafluoride", Z. Phys. Chem. 130 (1927), pp. 520–531.*
Adams, et al. "The Preparation and Some Properties of New Germanium Flouride". *J. Inorg. Nucl. Chem.*, 1971, vol. 33, pp. 1301–1306, no month.
Burg, Anton B. "Germanium Tetrafluoride", *Fluorine Chemistry*, Edited by Dr. J.H. Simons. Academic Press Inc., Publishers, New York, NY. 1950. vol. 1, pp. 110–111, 118–119, no month.
Hiroyuki et al. "Production of Germanium Tetrafluoride Having High Purity". PAJ 00–23–76, 01051329 JP, NDN– 190–0003–9421–0, no month.
Isao et al. "Production of Germanium Tetrafluoride". PAJ 08–01–94, 06234523 JP, NDN– 190–0171–8558–1.

* cited by examiner

*Primary Examiner*—Ngoc-Yen Nguyen
(74) *Attorney, Agent, or Firm*—Fellers, Snider, Blankenship, Bailey & Tippens, P.C.

(57) ABSTRACT

A method of producing high purity germanium tetrafluoride comprising the step of flowing a mixture of inert gas and fluorine gas through a reactor chamber preferably containing germanium powder. The reactor effluent stream is conducted through at least one product trap effective for condensing and retaining at least a portion of the germanium tetrafluoride product. The product is preferably then purified by repeatedly subliming the product as necessary to remove volatile impurities.

23 Claims, 1 Drawing Sheet

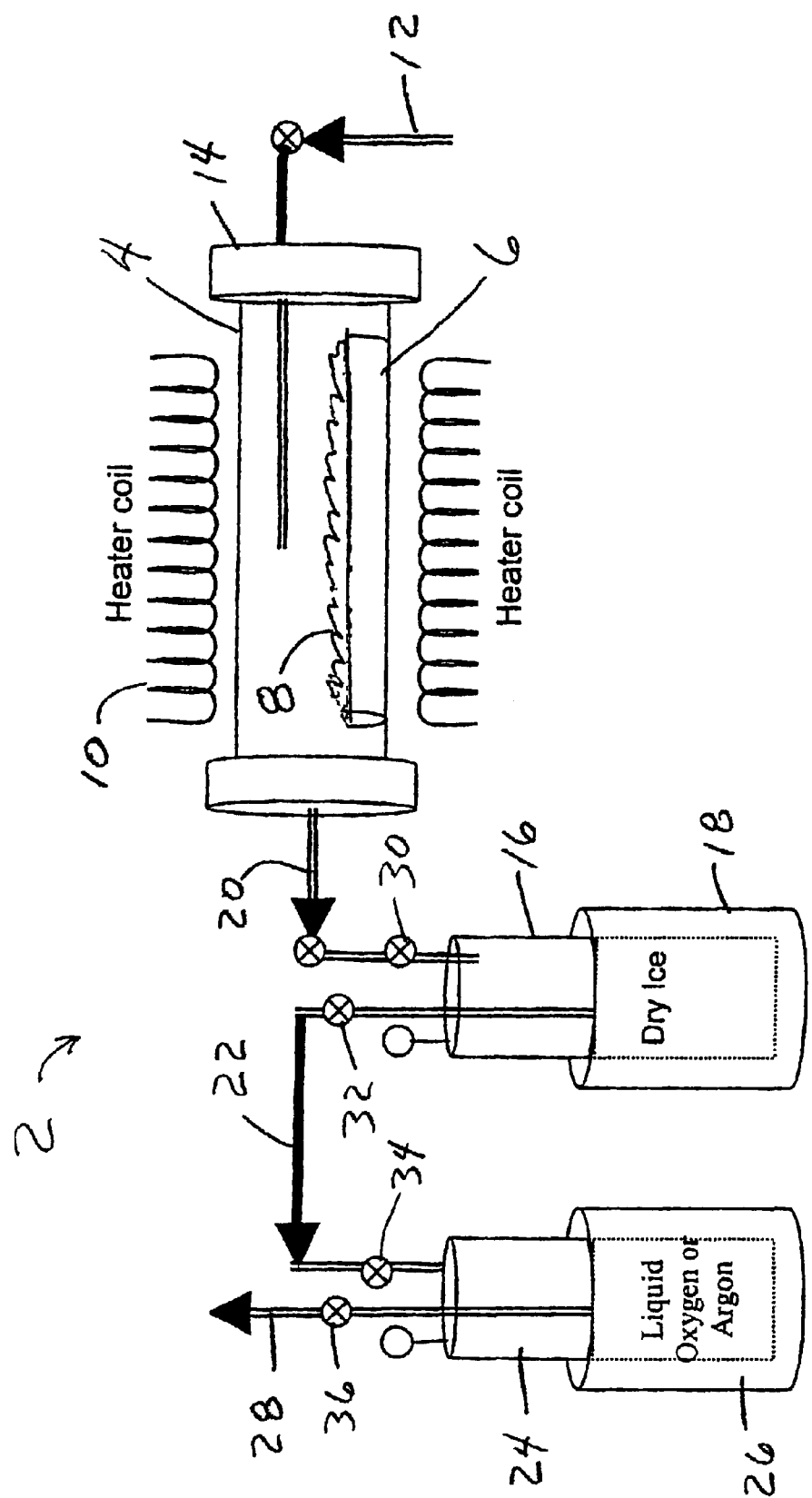

METHOD OF PRODUCING HIGH PURITY GERMANIUM TETRAFLUORIDE

BACKGROUND OF THE INVENTION

The present invention relates to methods of producing germanium tetrafluoride. More particularly, but not by way of limitation, the present invention relates to methods for producing ultra high purity germanium tetrafluoride suitable for use in, for example, semiconductor applications.

Several processes are known in the art for producing technical grade germanium tetrafluoride. One method involves the fluorination of germanium with undiluted fluorine or nitrogen trifluoride gas wherein the germanium is placed in a batch reaction chamber and the chamber is filled with the undiluted gas. The batch reactor is then allowed to set at a pressure of about 3 atmospheres and a temperature of from 250–500° C. Another production method involves the decomposition of barium fluorogermanate in a quartz tube at 750–1000° C. Another method involves the decomposition of hexafluorogermanic acid at 400–600° C. Another method utilizes halogen exchange between $GeCl_4$ and $SbF_3$ to yield a mixture comprising germanium tetrafluoride, $GeF_3Cl$, $GeF_2Cl_2$ and $GeFCl_3$. Still another method involves the reaction of sulfuric acid with a mixture of germanium oxide and one or more metal fluorides. Yet another method involves the reaction of germanium with uranium tetrafluoride.

Unfortunately, each of these prior techniques produces a substantial amount of volatile and/or nonvolatile impurities that are difficult and costly to separate from the desired reaction product. Examples of such impurities include: silicon tetrafluoride, sulfur hexafluoride, carbon tetrafluoride, $NO_x$, potassium fluorochlorides, hydrogen fluoride, germanium difluoride, transition metal fluorides, and elemental fluorine.

Thus, a need presently exists for a less complex and more cost effective method for producing high purity germanium tetrafluoride. Such method will also preferably provide a high product yield. A need particularly exists for a much less complicated and more cost effective approach for producing ultra high purity germanium tetrafluoride suitable for use in photovoltaic cells, in nanocrystals, as an ion implantation dopant, or in other semiconductor applications.

SUMMARY OF THE INVENTION

The present invention provides a method of producing high purity germanium tetrafluoride which satisfies the needs and alleviates the problems discussed above. The inventive method comprises the step of flowing a gas mixture comprising fluorine gas and an inert gas through a reactor having germanium therein. The fluorine gas contained in the gas mixture reacts with the germanium to produce germanium tetrafluoride which is included in the reactor product gas stream. The inventive method preferably also includes the step, prior to flowing the gas mixture through the reactor, of purifying the fluorine gas by cryogenically chilling to a temperature of less than −150° C. and contacting the chilled fluorine gas with sodium fluoride.

The inventive method also preferably comprises the step of conducting the reactor product stream through at least one product trap maintained at a temperature effective for condensing at least a portion of the germanium tetrafluoride from the reactor product stream. The condensed germanium tetrafluoride is preferably retained in the product trap.

In addition, the inventive method preferably includes the step of purifying the condensed germanium tetrafluoride to remove volatile impurities. The volatile impurities are preferably removed by subliming the germanium tetrafluoride in a product container through one or more "freeze/thaw" cycles and then evacuating the head gas from the product container to remove vaporized impurities therefrom. The steps of subliming and evacuating are preferably repeated until essentially all of the volatile impurities are removed.

In yet another aspect, the inventive method preferably further includes the step of removing nonvolatile impurities from the germanium tetrafluoride product by (a) sublimating the germanium tetrafluoride, in a container, to a vapor state and (b) transferring the sublimated germanium tetrafluoride out of the container such that the nonvolatile impurities are separated from the germanium tetrafluoride vapor.

Further objects, features, and advantages of the present invention will be apparent to those skilled in the art upon examining the accompanying drawing and upon reading the following detailed description of the preferred embodiments.

BRIEF DESCRIPTION OF THE DRAWING

The drawing schematically illustrates a reactor and recovery system 2 preferred for use in the inventive method.

DETAILED DESCRIPTION OF THE PREFERRED EMBODIMENTS

An embodiment 2 of a reactor and recovery system particularly well suited for use in connection with the present invention is depicted in the drawing. The reactor and recovery system 2 preferably comprises: a tubular reactor 4; a tray 6 which is removably positionable in reactor 4 for holding a quantity of finely divided elemental germanium 8; an electrical heating coil, a steam jacket, or other heating system 10 for warming reactor 4; a gas feed conduit 12 which preferably extends into reactor 4 through the inlet flange 14 thereof; at least one initial product trap 16 for receiving the reaction product gas from reactor 4 and for condensing and retaining at least a portion of the germanium tetrafluoride product; a cooling device such as a coolant dewar 18 which is removably positionable over at least a portion of the exterior of product trap 16; a reaction product conduit 20 extending from reactor 4 to product trap 16; and an effluent gas conduit 22 extending from product trap 16.

During the reaction and recovery process, as described hereinbelow, the initial product trap 16 is preferably maintained at a temperature effective for condensing at least a portion of the germanium tetrafluoride contained in the reaction product gas stream such that a solid germanium tetrafluoride product is formed and retained in product trap 16. In a particularly preferred embodiment, the reactor and recovery system 2 will include one or more product traps 16 which are cooled using dry ice in coolant dewar(s) 18 such that the product trap(s) 16 is/are maintained at about −78° C.

In addition to product trap(s) 16, the reactor and recovery system 2 preferably also includes a final product trap 24 which receives effluent gas from trap(s) 16 via conduit 22. Final trap 24 is maintained at a temperature effective for condensing additional germanium tetrafluoride product from the reaction product stream. Final product trap 24 will preferably be cooled using liquid oxygen or liquid argon. In a particularly preferred embodiment, the final product trap 24 is cooled using liquid oxygen in an exterior coolant container 26 such that the final trap 24 is maintained at a temperature of about −182.9° C. An effluent conduit 28 extending from final trap 24 delivers inert gas used in the inventive process and other noncondensed material to a scrubber and a vacuum pump (not shown) or other device capable of evacuating reactor and recovery system 2.

As will be understood by those skilled in the art, fluorine gas is highly reactive with many metal materials, particularly at high temperature. In order to protect the reactor and recovery system 2 and minimize the introduction of contaminants into the reaction product, the reactor 4 and product traps 16 and 24 are preferably formed of nickel or nickel alloy. In a particularly preferred embodiment of reactor and recovery system 2, the reactor 4 is formed of 200 nickel and the product traps 16 and 24 are formed of MONEL.

In the inventive method, a gas mixture comprising fluorine gas and at least one inert gas is delivered to reactor 4 via the gas feed conduit 12. The gas mixture flows through reactor 4 such that the fluorine gas contained in the mixture reacts with the finely divided elemental germanium on tray 6 to produce a gaseous germanium tetrafluoride product. The finely divided germanium 8 is preferably a powder material and most preferably has a particle size in the range of from about 50 to about 300 mesh.

The fluorine gas reactant used in the gas feed mixture is preferably ultra high purity fluorine gas which contains essentially no contaminants. The fluorine gas reactant will most preferably be at least 99.95% pure. The inert gas used to dilute the fluorine gas reactant will preferably be nitrogen, helium, argon, or a combination thereof. Due to its availability and lower cost, the inert gas used in the inventive method will most preferably be nitrogen.

Although highly pure elemental germanium powder products suitable for use in the inventive method are readily available, commercial fluorine gas products typically contain from about 6 to about 8 volume percent impurities. Common impurities include hydrogen fluoride, silicon tetrafluoride, $NO_x$, sulfur hexafluoride, and carbon tetrafluoride. Thus, as part of the present invention, the fluorine gas reactant used in the inventive process is preferably purified prior to being introduced into reactor 4. A process particularly preferred for purifying the fluorine gas reactant comprises the steps of: (a) cryogenically chilling the fluorine gas by indirect heat exchange using liquid nitrogen to a temperature of −150° C. or less and (b) contacting the chilled fluorine gas with sodium fluoride, preferably by delivering the chilled gas through a bed of sodium fluoride powder or crystals.

Prior to beginning the reaction process, the reactor 4 is preferably purged and the finely divided elemental germanium reactant 8 is preferably dried by, e.g., delivering dry inert gas through a reactor 4 via the feed conduit 12. During the purge and drying procedure, the reactor is preferably also heated to a temperature in the range of from about 125° C. to about 200° C.

After the purging and drying step, the entire reactor and recovery system 2 (including product traps 16 and 24) is preferably pressure tested for leaks. In the pressure test procedure, the reactor and recovery system 2 is preferably filled with inert gas to a pressure in the range of from about 1,200 to about 1,500 mm Hg and blocked in for at least one hour. Following the pressure test, the reactor and recovery system 2 is preferably gradually depressurized to about 760 mm Hg.

In the next step, product traps 16 and 24 are slowly cooled to their desired process temperatures. As indicated above, the initial product trap(s) 16 is/are most preferably cooled with dry ice to a temperature of about −78° C. and the final product trap 24 is most preferably cooled with liquid oxygen to a temperature of about −182.9° C. The reactor 4, on the other hand, is preferably warmed to a temperature in the range of from about 125° C. to about 200° C. using the reactor heating system 10. Also, inert gas flow through the system is resumed. This cooling and warming step is preferably continued and adjusted as necessary until the system has substantially stabilized at the desired process temperature conditions.

After the system temperatures have substantially stabilized, the purified fluorine gas reactant is introduced into the inert gas stream. The reaction of the fluorine gas with the elemental germanium powder to produce germanium tetrafluoride is exothermic in nature and causes the temperature within reactor 4 to increase. Thus, the introduction of fluorine gas is preferably begun at a relatively low concentration and is slowly increased until a desired maximum reaction temperature is achieved. The maximum reaction temperature will preferably be in the range of from about 300° to about 400° C. and will most preferably be about 350° C. External cooling can also be applied to reactor 4 (e.g., by opening the reactor insulation blanket, applying forced air or coolant, or other means) as necessary to control the reaction temperature and prevent the reactor system from overheating.

To assist in preventing the formation of germanium difluoride impurities, the initial concentration of fluorine gas in the feed gas mixture will preferably be at least 30% by volume based upon the total volume of fluorine gas and inert gas in the feed gas mixture. During the course of the reaction step, the fluorine concentration in the feed gas mixture will preferably be increased to a maximum amount in the range of from about 60% to about 80% by volume. As indicated above, the inert gas will preferably be nitrogen, helium, argon, or a combination thereof and will most preferably be nitrogen.

The total fluorine gas introduced into reactor 4 will preferably be an amount in excess of the stoichiometric amount required to react with all of the elemental germanium 8 provided on reactor tray 6. After the stoichiometric amount of fluorine gas has been introduced, the reaction temperature will begin to decline. As the drop in reaction temperature occurs, the flow of fluorine gas will preferably be continued to a point of at least three percent, more preferably about seven percent, in excess of stoichiometric. The introduction of fluorine gas is then gradually stopped and the flow of inert gas is continued in order to purge the reactor system. During the purge step, potassium iodide paper or other means can be used to detect the presence of any fluorine gas remaining in the reactor effluent stream.

The purge step is preferably continued until no fluorine is detected in the reactor effluent. At that point, the flow of inert gas through the system is stopped. In addition, the reactor and recovery system 2 is preferably evacuated to at least partial vacuum in order to further remove any residual fluorine.

The reactor effluent valve 30 is then closed and the evacuation of traps 16 and 24 is continued. Following evacuation, valves 32, 34, and 36 are closed to isolate each of the individual traps 16 and 24 from the remainder of system 2.

During the reaction process, germanium tetrafluoride product contained in the reactor product stream is condensed in the product traps 16 and 24 and retained in solid form. The initial product trap(s) 16 is/are chilled to a temperature effective for condensing germanium tetrafluoride from the reactor effluent and are used for producing ultra high purity germanium tetrafluoride product. To prevent the condensation of an excessive amount of volatile impurities therein, the initial product traps 16 are preferably not chilled to a temperature below −85° C. As indicated above, initial trap(s) 16 is/are most preferably chilled to a temperature of about −78° C. using dry ice. In the inventive process, the initial product trap(s) 16 will typically condense and retain from about 85% to about 90% of the germanium tetrafluoride product produced in reactor 4.

The remaining germanium tetrafluoride product contained in the reactor product stream is condensed and retained as solid, technical grade product in the final product trap 24. Final trap 24 is maintained at a temperature effective for condensing at least a portion of the germanium tetrafluoride remaining in the effluent from initial trap(s) 16. Thus, final product trap 24 will typically be maintained at a temperature below that of the initial trap(s) 16. As indicated above, final product trap 24 will most preferably be chilled to a temperature of about −182.9° C. using liquid oxygen.

The material recovered in initial product trap(s) 16 is next purified as necessary to remove volatile and/or nonvolatile contaminants and obtain the desired ultra high purity germanium tetrafluoride product. Volatile impurities are preferably removed using a subliming process wherein, as will be understood by those of skill in the art, the germanium tetrafluoride product is sublimated (e.g., by raising the temperature thereof) to its vapor state and then recondensed to solid form. The subliming process will typically be repeated one or more times until the desired purity is achieved.

Nonvolatile impurities, on the other hand, are preferably removed by sublimating the germanium tetrafluoride product to a vapor state and then separating the vaporized product from any remaining nonvaporized solid and/or liquid material. Such separation can be achieved by simply transferring the germanium tetrafluoride vapor to another container.

Although the removal of volatile and nonvolatile impurities can be performed in any order, the above-mentioned subliming procedure to remove volatile impurities will preferably be conducted first. This allows the product trap 16 itself to be conveniently used for performing the subliming process.

In the subliming process, the solid germanium tetrafluoride in the product trap 16 is preferably warmed slowly to a temperature effective for sublimating at least a portion of the germanium tetrafluoride to its vapor state. The warming step can be conducted, for example, by simply gradually removing the dry ice coolant from the exterior of trap 16. The warming step will preferably be continued either until a temperature in the range of from about −35° C. to about −20° C. is obtained or until the pressure within the closed product trap 16 reaches or exceeds a desired value (typically about 100 mm Hg). The product trap 16 is then rechilled sufficiently to recondense the germanium tetrafluoride product to its solid state. In each rechilling step, the product trap 16 will most preferably be cooled to about −78° C. using dry ice.

Following the rechilling step, the product trap 16 is again evacuated (using, e.g., the system vacuum pump or other vacuum device) to remove noncondensed, volatile impurities therefrom. Examples of such impurities can include $O_2$, Ar, CO, $CO_2$, $N_2$, carbon tetrafluoride, $NO_x$, and/or hydrogen fluoride.

In the evacuation step, the product trap 16 is most preferably evacuated to vacuum or near vacuum. The trap 16 is then blocked in and allowed to set at chilled temperature until a vapor pressure equilibrium condition within the trap 16 is achieved. The continued presence of volatile impurities in the product will elevate the equilibrium vapor pressure within product trap 16. Thus, if the measured equilibrium vapor pressure exceeds a desired target vapor pressure, the subliming process will preferably be repeated until the vapor pressure target is met and the level of volatile impurities is within acceptable limits. The target vapor pressure will preferably be approximately equal to the sublimation pressure of 100% germanium tetrafluoride at the chilled temperature conditions existing within product trap 16. Assuming that the product trap 16 has been rechilled to about −78° C., the target equilibrium vapor pressure will preferably be about 18 mm Hg.

To remove nonvolatile impurities, product trap 16 will preferably be warmed (e.g., by slowly removing the dry ice container 18 therefrom) until essentially all of the germanium tetrafluoride product therein is sublimated to a vapor state. Typically, the contents of product trap 16 will be warmed to a temperature in the range of from about −35° C. to about 0° C. Next, the vaporized germanium tetrafluoride product will simply be transferred to another container such that all nonvaporized solid or liquid impurities will be retained in trap 16 and thereby separated from the germanium tetrafluoride product. Examples of solid impurities which may be present include nickel difluoride, copper difluoride, chromium difluoride, uranium tetrafluoride, iron trifluoride, and/or germanium difluoride.

Following the purification procedures, a sample of the purified germanium tetrafluoride product can be analyzed, preferably by gas chromatograph, to determine whether unacceptable levels of any volatile impurities remain. If unacceptable levels of volatile impurities are detected, the above-described subliming purification procedures can be repeated.

To determine whether unacceptable levels of any nonvolatile metallic impurities remain in the purified product, a sample of the product can be hydrolyzed by neutralizing with ultra high purity sodium hydroxide and then adding a sufficient amount of ultra high purity hydrochloric acid to bring pH to 7. As will be understood by those skilled in the art, metallic impurities contained in the hydrolyzed sample can then be detected and measured by the Inductively coupled plasma method.

EXAMPLE

Ultra high purity germanium tetrafluoride product was produced using a reactor and recovery system 2 of the type illustrated in the drawing. The germanium tetrafluoride product was determined to be 99.99+% pure with respect to volatile contaminants and 99.999% pure with respect to nonvolatile metallic impurities. The product was produced using 99.99% pure fluorine gas which was obtained by cryogenically chilling commercial fluorine gas to −150° C. using liquid nitrogen and then passing the chilled gas through a bed of sodium fluoride pellets.

4,253 grams of elemental germanium powder were placed upon tray 6 within tubular reactor 4 and the reactor inlet flange 14 was tightly closed and sealed using an impact wrench. The reactor 4 was then heated to about 200° C. and purged with dry nitrogen gas for about 12 hours. After purging, the reactor system was pressure tested at about 1500 mm Hg for one hour to check for leaks.

Following the pressure test, dry ice was applied to the first product trap 16 and liquid oxygen was applied to the second product trap 24. The reactor 4 was also reheated and inert gas flow through the system was resumed. This step was continued until equilibrium temperatures of 156° C. in reactor 4, −78° C. in the first product trap 16, and −182.9° C. in the second product trap 24 were achieved.

Upon reaching the desired equilibrium temperature conditions, the ultra pure fluorine gas reactant was added to the inert gas feed stream. An initial mixture of 0.3 liters per minute of fluorine gas and 0.25 liters per minute of nitrogen was fed to reactor 4 for one hour. At the end of the first hour, the temperature of reactor 4 had increased to 225° C. The fluorine feed rate was then increased to 0.5 liters per minute for one hour and the reactor temperature rose to 275° C. Next, the fluorine feed rate was increased to 0.65 liters per minute for one hour and the reactor temperature increased to 300° C. Finally, the fluorine flow rate was raised to 0.75 liters per minute and the reactor temperature rose to 325° C. after one hour. The maximum reaction temperature achieved was 350° C. During the entire reaction step, a total of 2,806 liters of fluorine gas were used.

The germanium tetrafluoride product condensed and retained in product trap 16 was then purified of volatile contaminants using repeated subliming steps conducted in trap 16. In each of the subliming steps, the product was rechilled to a temperature of −78° C. using dry ice. The subliming procedure was repeated until an equilibrium vapor pressure of 18 mm Hg was achieved.

Finally, nonvolatile impurities were removed from the product by warming the trap 16 to about −20° C. such that essentially all of the germanium tetrafluoride product was sublimated to a vapor state. The vaporized product was then transferred to another product container.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of producing high purity germanium tetrafluoride comprising the step of flowing a gas mixture comprising fluorine gas and inert gas through a reactor having germanium therein such that said fluorine gas reacts with said germanium to produce a product stream comprising germanium tetrafluoride.

2. The method of claim 1 wherein said inert gas is selected from the group consisting of nitrogen, helium, argon, and combinations thereof.

3. The method of claim 1 wherein said germanium has a particle size in the range of from about 50 to about 300 mesh.

4. The method of claim 1 wherein, prior to said step of flowing, said fluorine gas is purified by cryogenically chilling said fluorine gas to −150° C. or less and contacting said chilled fluorine gas with sodium fluoride.

5. The method of claim 1 wherein, prior to said step of flowing, said germanium is dried by passing inert gas through said reactor.

6. The method of claim 1 wherein said reactor has a reactor temperature and, during said step of flowing, the ratio of said fluorine gas to said inert gas in said gas mixture is increased such that said reactor temperature increases.

7. The method of claim 6 wherein, during said step of flowing, said reactor temperature increases to a temperature in the range of from about 300° to about 400° C.

8. The method of claim 7 wherein, prior to said step of flowing, said reactor is heated to a reactor temperature in the range of from about 125° to about 200° C.

9. The method of claim 6 wherein, during said step of flowing, the fluorine concentration in said gas mixture is increased to a maximum concentration of from about 60% to about 80% by volume based upon the total amount of said fluorine gas and said inert gas in said gas mixture.

10. The method of claim 9, wherein, in said step of flowing, said gas mixture has an initial amount of said fluorine gas of at least 30% by volume based upon the total amount of said fluorine gas and said inert gas in said gas mixture.

11. The method of claim 1 further comprising the step of conducting said product stream through at least one product trap maintained at a temperature effective for condensing at least a portion of said germanium tetrafluoride from said product stream, said portion of said germanium tetrafluoride is retained in said product trap.

12. The method of claim 11 wherein said product trap is chilled using dry ice.

13. The method of claim 12 wherein said temperature of said product trap during said step of conducting is about −78° C.

14. The method of claim 11 wherein, said conducting step utilizes a plurality product traps and effluent from a first product trap is conducted through at least one additional product trap maintained at a temperature effective for condensing an additional portion of said germanium tetrafluoride from said product stream.

15. The method of claim 14 wherein said additional product trap is chilled using liquid oxygen.

16. The method of claim 15 wherein said temperature of said additional product trap during said step of conducting is about −182.9° C.

17. The method of claim 11 further comprising the step of purifying said portion of said germanium tetrafluoride to remove volatile impurities, said portion of said germanium tetrafluoride is in a container and said step of purifying including the steps of:

(a) subliming at least a portion of said germanium tetrafluoride in said container and then (b) evacuating said container to remove vapor therefrom.

18. The method of claim 17 wherein said container is said product trap.

19. The method of claim 17 further comprising the steps, following step (b), of:

(c) measuring a vapor pressure in said container;

(d) comparing said vapor pressure to a target vapor pressure; and (e) repeating steps (a) and (b) if said vapor pressure exceeds said target vapor pressure.

20. The method of claim 19 wherein said target vapor pressure is approximately the equilibrium sublimation pressure of 100% germanium tetrafluoride at a temperature equal to that existing in said container.

21. The method of claim 11 further comprising the step of removing nonvolatile impurities from said portion of said germanium tetrafluoride, said portion of said germanium tetrafluoride is in a container and said step of removing including the steps of:

(a) sublimating said germanium tetrafluoride in said container to a vapor state and (b) transferring said sublimated germanium tetrafluoride out of said container such that said nonvolatile impurities are separated from said sublimated germanium tetrafluoride.

22. The method of claim 21 wherein, in step (b), said nonvolatile impurities are retained in said container.

23. The method of claim 21 wherein said container is said product trap.

* * * * *